United States Patent [19]

Ogino

[11] Patent Number: 4,626,040
[45] Date of Patent: Dec. 2, 1986

[54] METHOD FOR CONTROLLING THE START OF VEHICLE

[75] Inventor: Kinzi Ogino, Saitama, Japan

[73] Assignees: Akebono Brake Industry Co., Ltd., Tokyo; Akebono Research and Development Centre Ltd., Saitama, both of Japan

[21] Appl. No.: 761,613

[22] Filed: Aug. 1, 1985

[30] Foreign Application Priority Data

Aug. 8, 1984 [JP] Japan ................. 59-165980

[51] Int. Cl.$^4$ ............................................. B60T 8/82
[52] U.S. Cl. ..................................... 303/96; 303/111; 180/197
[58] Field of Search ................. 303/94, 95, 96, 97, 303/98, 99, 111, 110; 188/181 R, 181 A, 181 C; 180/197

[56] References Cited

U.S. PATENT DOCUMENTS 3,667,813 6/1972 Burckhardt et al. ................. 303/96
3,684,047 8/1972 Zeisloft et al. .................. 188/181 C
3,872,953 3/1975 Taylor ............................... 188/353

Primary Examiner—Duane A. Reger
Assistant Examiner—Alvin Oberley
Attorney, Agent, or Firm—Toren, McGeady, Stanger, Goldberg & Kiel

[57] ABSTRACT

In a vehicle having a brake fluid pressure controller arranged to control brake fluid pressure on following and driving wheels, one independently of the other, a brake fluid pressure retaining device arranged to retain brake fluid pressure for parking by means of said fluid pressure controller and an engine revolution controller, a method for controlling the start of the vehicle comprising the steps of (a) completely releasing the brake fluid pressure on the following wheel and gradually reducing the driving wheel brake fluid pressure in response to a vehicle starting operation; (b) holding the driving wheel brake fluid pressure at a value which is obtained at a point of time when the rotation of the driving wheel is detected; (c) stopping the acceleration of engine revolution at a point of time when the rotating speed of the driving wheel comes to exceed a predetermined value and then lowering the rotating speed of the driving wheel at least either by increasing the brake fluid pressure on the driving wheel or by reducing the number of revolutions of the engine; (d) gradually raising the rotating speed of the driving wheel at least either by lowering the brake fluid pressure on the driving wheel or by accelerating the engine revolution; and (e) completely releasing the brake fluid pressure on the driving wheel by cancelling an ensuing control operation when the rotation of the following wheel is detected at any of the above-stated steps (a), (b) and (c).

8 Claims, 8 Drawing Figures

METHOD FOR CONTROLLING THE START OF VEHICLE

BACKGROUND OF THE INVENTION

1. Field of the Invention

This invention relates to a vehicle starting control method for ensuring a smooth start of a vehicle.

2. Description of the Prior Art

The running of a vehicle is generally controlled by means of an engine which imparts a rotating torque to wheels; a driving force transmitting arrangement including a transmission, etc.; a brake device which applies brake to the rotation of the wheels; and a steering device which determines the running direction of the vehicle. There have been proposed various auxiliary running control devices, including an antiskid control device which is arranged to prevent the wheel from coning into a locked state upon brake application; and a brake fluid pressure retaining device which is arranged to hold brake fluid pressure for temporary parking as disclosed, for example, in U.S. Pat. No. 3,872,953.

Meanwhile, in the event of a slippery road surface having a low coefficient of friction such as a snow-laden road or the like, it is desirable in terms of safety, etc. to have a vehicle arranged to be capable of smoothly starting to run. To meet this requirement, there have been also proposed some start control devices. For example, a device of this kind has been known from U.S. Pat. No. 3,684,047.

SUMMARY OF THE INVENTION

It is an object of this invention to provide a start control method for suitably combining a start control device with the above-stated brake fluid pressure retaining device.

To attain this object, in a method according to this invention, the brake fluid pressure and the number of engine revolutions are controlled on the basis of the detected speeds of the driving and following wheels of a vehicle.

The above-stated object and features of this invention will become apparent from the following detailed description of a preferred embodiment thereof taken in conjunction with the accompanying drawings.

DETAILED DESCRIPTION OF PREFERRED EMBODIMENT

Figure 1:
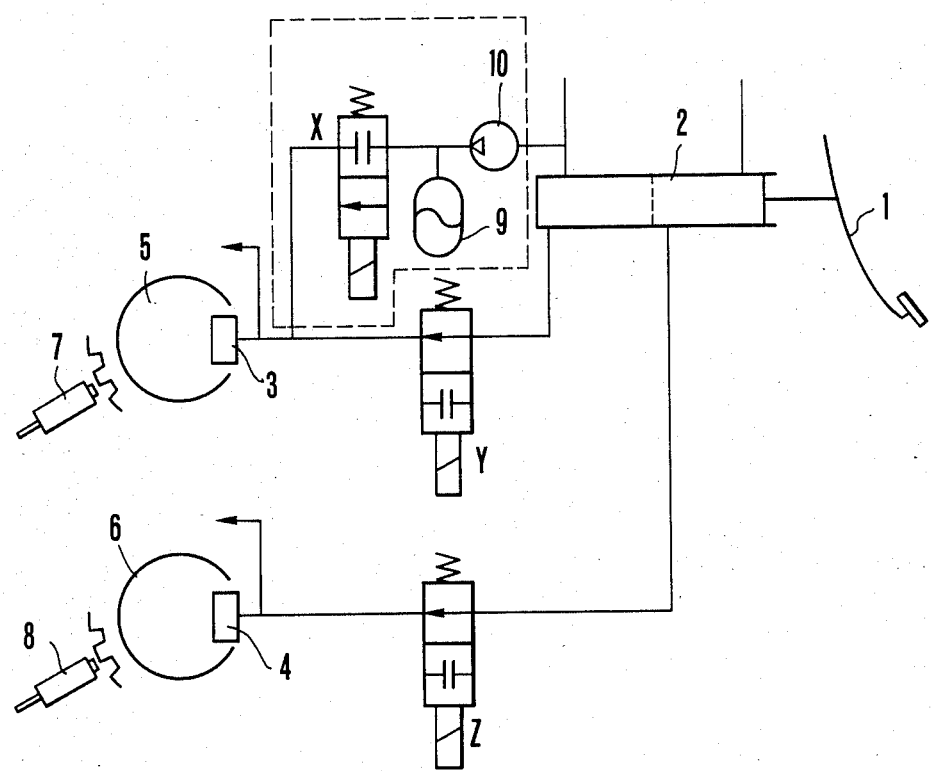
FIG. 1 is a schematic illustration showing the outline of arrangement of a brake fluid pressure system to which the present invention is applied.

The following describes an application example of the present invention with reference to the accompanying drawings:

FIG. 1 schematically shows an output of a brake fluid pressure system to which the invented method is applied. The illustration includes a brake pedal 1; and a tandem master cylinder 2. One of the fluid chambers of the tandem master cylinder 2 is connected via a normally open type solenoid valve Y to a driving wheel brake cylinder 3 while the other is connected via another normally open type solenoid valve Z to a following wheel brake cylinder 4. The illustration also includes a driving wheel 5; a following wheel 6; and speed sensors 7(v1) and 8 (v2) which are arranged to detect the rotating speeds of the driving wheel and the following wheel. After the brake pedal 1 is stepped down, when a complete stop of the vehicle is detected by the speed sensors 7 (V1) and 8 (V2), the fluid pressure controller instructs the normally open type solenoid valves Y and Z to shift to their closed states. These solenoid valves thus form a portion of a brake fluid pressure rataining device which is arranged to prevent the pressure fluid from returning from the brake cylinders 3 and 4 to the master cylinder 2.

The illustration further includes an accumulator 9 which is arranged to store the pressure of the pressure fluid to a predetermined level via a pump 10. The fluid pressure stored within the accumulator 9 is arranged to be supplied as necessary to the driving wheel brake cylinder 3 with the normal open type solenoid valve X shifted to an open state.

Figure 2:
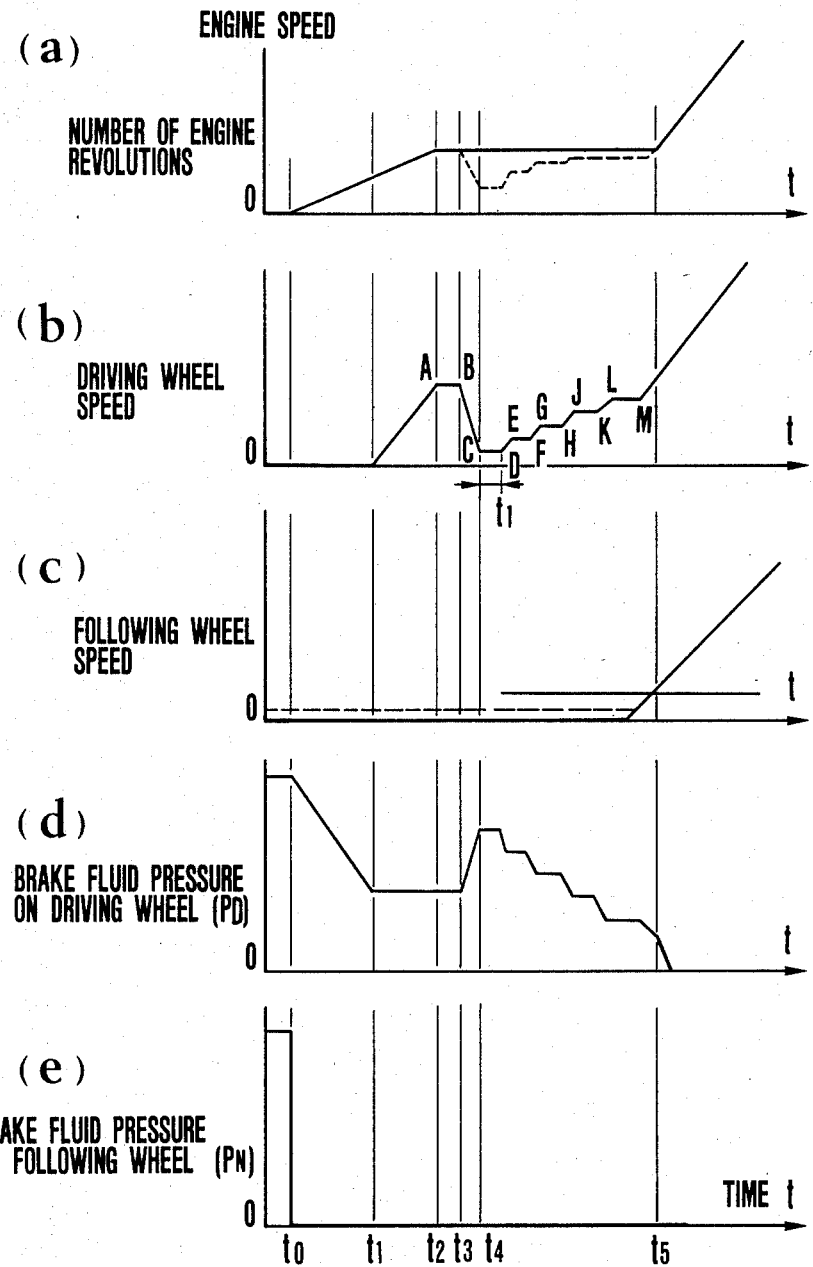
FIGS. 2(a) to 2(e) are graphs showing the relation of brake fluid pressure to the number of engine revolutions and the rotating speeds of wheels.

FIG. 2 shows the interrelation of the revolution of the engine at the start of the vehicle, the speeds of wheels and the brake fluid pressure which obtains under the operation of the brake fluid pressure system which is arranged as described above.

When a starting operation is performed on the vehicle by stepping on an accelerator pedal in the case of an automatic transmission type vehicle or by allowing the clutch to connect in the case of a manual transmission type vehicle at a point of time t0, the brake fluid pressure Pn of the following wheel is fully released in response to the starting operation. Meanwhile, the brake fluid pressure on the driving wheel is gradually reduced at a predetermined rate (see parts (a), (d) and (e) of FIG. 2.) Then, the number of engine revolutions is gradually accelerated according as the accelerator pedal is stepped downward. Accordingly, the torque transmitted to the driving wheel increases while the braking force on the wheel decreased. The increase of the torque and the decrease of the braking force jointly urge the driving wheel to turn. Then, at a point of time t1, the driving wheel comes to rotate. During this urging process, if the road surface is in a state of having a high coefficient of friction, the driving wheel begins to rotate while sufficiently sticking to the road surface. Under such a condition, the following wheel also comes to rotate almost simultaneously with the driving wheel to thus effect a start of the vehicle. After that, the brake fluid pressure on the driving wheel is completely released and the vehicle is brought into a normal starting mode.

Whereas, in cases where the road surface is in a state of a low friction coefficient or in an uphill condition, there sometimes arises a condition in which the rotation of the driving wheel is not followed by the following wheel, that is, abnormal slippage of the driving wheel takes place. On that occasion, the occurrence of such a slip is detected at a point of time t2 when the rotating speed of the driving wheel exceeds a predetermined value A. Then, the driving wheel brake fluid pressure is retained and, at the same time, the number of engine revolutions is stopped from increasing through control over the opening degree of a throttle or the like, as shown in FIG. 2 at parts (a) and (b). After that, in the case of this specific embodiment example of the invention, the driving wheel brake fluid pressure is increased up to a predetermined value while keeping the number of engine revolutions at a predetermined value during a period between points of time t3 and t4. The rotating speed of the driving wheel is dropped by this process as shown in parts (b) and (d) in FIG. 2.

After the point of time t4, the brake fluid pressure on the driving wheel is lowered stepwise while the rotating speed of the driving wheel is allowed to increase, in the case of this embodiment example, as shown at parts (b) and (d) in FIG. 2. The driving wheel brake fluid pressure is completely released at a point of time t5 when the rotation of the following wheel is detected. Further, since the detection of the rotation of the following wheel indicates a start of the vehicle, the detecting level of the following wheel rotation is preferably set at a suitable value, so that the start of the vehicle can be reliably detected.

Figure 3:
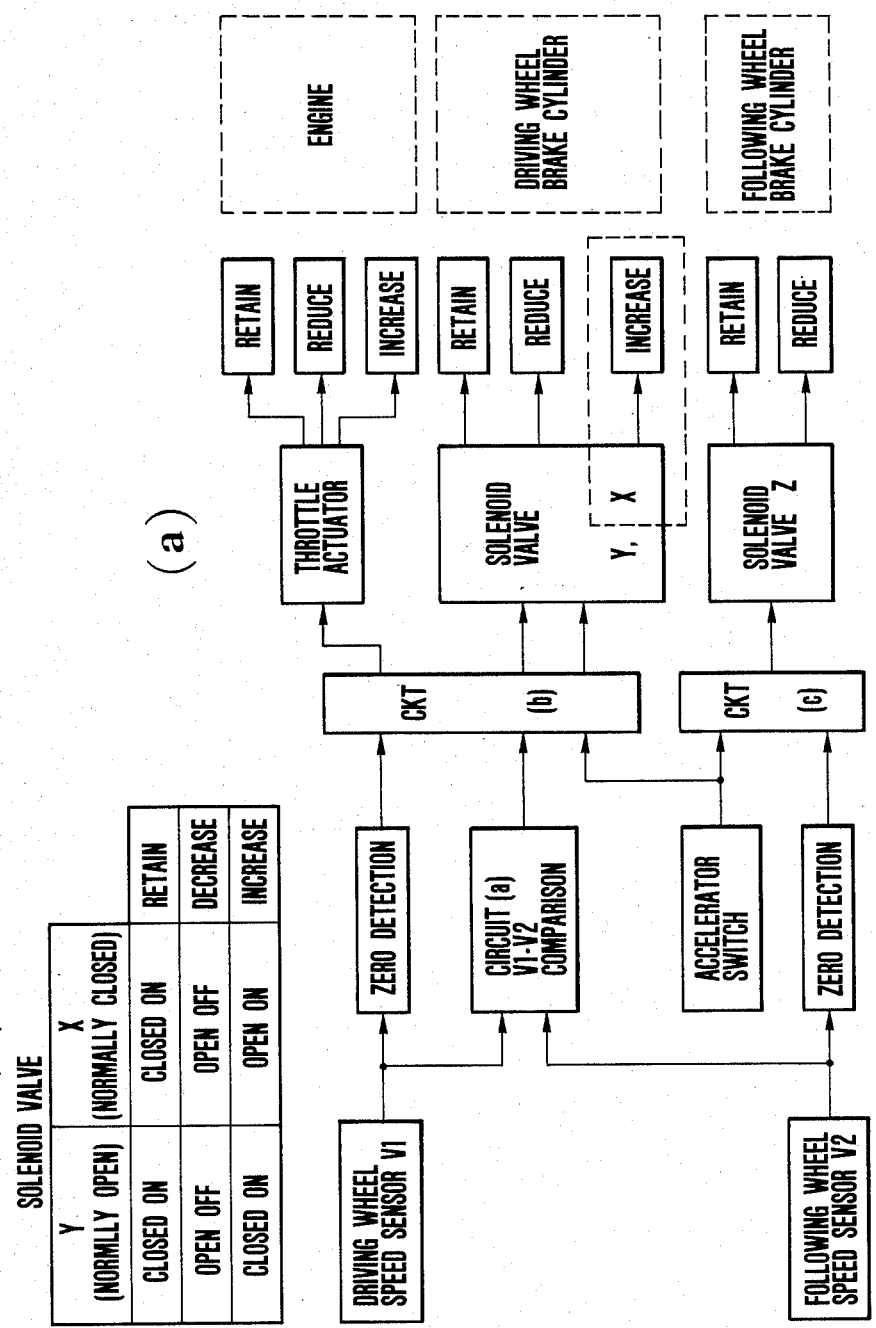
FIG. 3(a) is a block diagram showing by way of example a fluid pressure control circuit.
FIG. 3(b) shows solenoid valves X and Y in relation to fluid pressure control.

Further, in case where the rotation of the following wheel is detected before the end of the period between the points of time t1 and t5, a signal representing this detection of rotation is handled as a preferential signal for the ensuing processes including the release of control and complete release of the driving wheel from the brake fluid pressure, because: The vehicle has already started to run in that event. FIG. 3(a) shows in a block diagram an example of arrangement of a control circuit required for accomplishing the control operation described. FIG. 3(b) shows the opening and closing operation of the solenoid valves X and Y in relation to the retention, increase and decrease of the brake fluid pressure on the driving wheel.

In accordance with this invention, the control operation described may be carried out in different manners including, for example: During the period between the time points t4 and t5, the driving wheel rotation speed may be caused to gradually increase by accelerating and decelerating the revolution of the engine. The gradual increase may be effected concurrently with the control over the driving wheel brake fluid pressure PD. The control may be carried out non-stepwise instead of the stepwise control. In case that the rotating speed of the driving wheel comes to exceed the above-stated predetermined value A after the time point t4, the control may be brought back to the cycle of step of the time point t3 to ease down the sharp rise of the rotating speed of the driving wheel. In that instance, the increasing rate of the rotating speed at the next cycle is preferably arranged to be slower than the preceding cycle. The invented method enables, as mentioned in the foregoing, a vehicle to smoothly and reliably start on a road of a low coefficient of friction.

Further, in accordance with the invented method, the brake fluid pressure retaining device can be combined with a start control device, so that the essential parts such as the speed sensors, the solenoid valves, etc. can be arranged in common for the two different devices. This is another advantageous feature of this invention.

What is claimed is:

1. In a vehicle having a brake fluid pressure controller arranged to control brake fluid pressure on following and driving wheels, one independently of the other, a brake fluid pressure retaining device arranged to retain brake fluid pressure for parking by means of said fluid pressure controller and an engine revolution controller, a method for controlling the start of said vehicle comprising the steps of:
    (a) completely releasing the brake fluid pressure on said following wheel and gradually reducing the brake fluid pressure on said driving wheel in response to a vehicle starting operation;
    (b) holding said driving wheel brake fluid pressure at a value which is obtained at a point of time when the rotation of the driving wheel is detected;
    (c) stopping the acceleration of engine revolution at a point of time when the rotating speed of said driving wheel comes to exceed a predetermined value and then lowering the rotating speed of said driving wheel at least either by increasing said brake fluid pressure on said driving wheel or by reducing the number of revolution of said engine;
    (d) gradually raising the rotating speed of said driving wheel at least either by lowering the brake fluid pressure on said driving wheel or by accelerating the revolution of said engine; and
    (e) completely releasing the brake fluid pressure on said driving wheel by cancelling an ensuing control operation when the rotation of said following wheel is detected at any of said steps (a), (b) and (c).

2. A method according to claim 1, wherein said brake fluid pressure on said following and driving wheels are controlled by said brake fluid pressure controller via a pair of normally open type solenoid valves which are forming a portion of said brake fluid pressure retaining device.

3. A method according to claim 1, wherein said increasing action on the brake fluid pressure on said driving wheel is performed by said brake fluid pressure controller by supplying the fluid pressure of an accumulator via a normal closed type solenoid valve to a driving wheel brake cylinder.

4. A method according to claim 1, said detection of rotation of said following wheel at which the ensuing control operation is to be cancelled at any of the steps (a), (b) and (c) is arranged to be made when the rotation of said following wheel reaches a predetermined level.

5. A method according to claim 1, wherein said gradual raising operation on the rotation of said driving wheel at the step (d) is arranged to be performed by lowering the brake fluid pressure.

6. A method according to claim 1, wherein said gradual raising operation on the rotation of said driving wheel at the step (d) is arranged to be performed by accelerating the revolution of said engine.

7. A method according to claim 1, wherein said gradual raising operation on the rotation of said driving wheel at the step (d) is arranged to be performed by simultaneously carrying out reduction in the brake fluid pressure and acceleration of the engine revolution.

8. A method according to claim 1, wherein, in case that the rotating speed of said driving wheel exceeds said predetermined value at the step (d) of gradually raising the rotation of said driving wheel, the control operation comes back to the cycle of said step (c).

* * * * *